(12) United States Patent
Kogure et al.

(10) Patent No.: US 12,308,626 B2
(45) Date of Patent: May 20, 2025

(54) WIRE HARNESS HAVING IMPROVED FOLLOWABILITY TO A ROTATIONAL MOTION OF A LINK MECHANISM

(71) Applicants: YAZAKI CORPORATION, Tokyo (JP); AISIN CORPORATION, Aichi (JP)

(72) Inventors: Naoto Kogure, Shizuoka (JP); Hikaru Sano, Shizuoka (JP); Seiichi Sumiya, Aichi (JP)

(73) Assignees: YAZAKI CORPORATION, Tokyo (JP); AISIN CORPORATION, Aichi (JP)

( * ) Notice: Subject to any disclaimer, the term of this patent is extended or adjusted under 35 U.S.C. 154(b) by 246 days.

(21) Appl. No.: 18/170,825

(22) Filed: Feb. 17, 2023

(65) Prior Publication Data

US 2023/0275416 A1    Aug. 31, 2023

(30) Foreign Application Priority Data

Feb. 28, 2022   (JP) ................................. 2022-028839

(51) Int. Cl.
*H02G 11/00*    (2006.01)
*H02G 3/04*     (2006.01)

(52) U.S. Cl.
CPC .......... *H02G 11/00* (2013.01); *H02G 3/0462* (2013.01)

(58) Field of Classification Search
CPC ...... H01R 13/72; H01R 13/502; H01R 35/04; H02G 11/00; H02G 3/0462

USPC ....................................................... 174/72 A
See application file for complete search history.

(56) References Cited

U.S. PATENT DOCUMENTS

| | | | |
|---|---|---|---|
| 6,070,931 A * | 6/2000 | Yamaguchi | B60R 16/0215 296/146.7 |
| 2007/0148992 A1 | 6/2007 | Sato et al. | |
| 2007/0148994 A1 | 6/2007 | Sato et al. | |
| 2020/0176960 A1* | 6/2020 | Tomosada | H02G 11/00 |

FOREIGN PATENT DOCUMENTS

| | | |
|---|---|---|
| DE | 10 2006 061 639 A1 | 7/2007 |
| DE | 10 2006 061 641 A1 | 7/2007 |
| JP | 2009-213315 A | 9/2009 |

* cited by examiner

*Primary Examiner* — Timothy J Thompson
*Assistant Examiner* — Michael F McAllister
(74) *Attorney, Agent, or Firm* — Sughrue Mion, PLLC (57) ABSTRACT

A wire harness includes a first protector disposed in a fixed first link, a second protector disposed in a second link relatively rotatable with respect to the first link, a flexible tubular exterior member, and an electric wire inserted through each of the first protector, the second protector, and the exterior member and routed to the second link. A base of the second link is supported by the first link via a rotating shaft such that the second link is relatively rotatable with respect to the first link centering on the base, the first protector includes a first tubular section opened toward the rotating shaft, and a first end portion of the exterior member is fixed to the first tubular section.

5 Claims, 9 Drawing Sheets

WIRE HARNESS HAVING IMPROVED FOLLOWABILITY TO A ROTATIONAL MOTION OF A LINK MECHANISM

CROSS-REFERENCE TO RELATED APPLICATION(S)

The present application claims priority to and incorporates by reference the entire contents of Japanese Patent Application No. 2022-028839 filed in Japan on Feb. 28, 2022.

BACKGROUND OF THE INVENTION

1. Field of the Invention

The present invention relates to a wire harness.

2. Description of the Related Art

There has been a technique for absorbing an extra length of a wire harness. Japanese Patent Application Laid-open No. 2009-213315 discloses an extra length absorbing structure of a wire harness in which a harness protector is arranged in a first link turnably supported by a shaft section on a base and a second link turnably supported by a shaft section on a distal end side of the first link while being offset from centers of the shaft sections, a wire harness is slidably inserted into the harness protector, one side of the wire harness is fixed to a harness fixing section on the base side, and another side of the wire harness is fixed to a harness fixing section on the second link side.

There is room for improvement in improving followability of a wire harness to a rotational motion of a link mechanism. For example, in a wire harness including an electric wire and an exterior member, if the exterior member can be caused to independently follow a rotational motion, a degree of freedom in absorption of an extra length of the electric wire is improved.

SUMMARY OF THE INVENTION

An object of the present invention is to provide a wire harness that can improve followability to a rotational motion of a link mechanism.

A wire harness according to one aspect of the present invention includes a first protector disposed in a fixed first link; a second protector disposed in a second link relatively rotatable with respect to the first link; and a flexible tubular exterior member including a first end portion fixed to the first protector and a second end portion fixed to the second protector; and an electric wire inserted through each of the first protector, the second protector, and the exterior member and routed to the second link; wherein the second link includes a base located at one end in a longitudinal direction, and the base is supported by the first link via a rotating shaft such that the second link is relatively rotatable with respect to the first link centering on the base, the first protector includes a first tubular section opened toward the rotating shaft, the first end portion of the exterior member is fixed to the first tubular section, and the exterior member extends and contracts according to a change in a line length between the first protector and the second protector caused by relative rotation of the second link with respect to the first link.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

A wire harness according to an embodiment of the present invention is explained in detail below with reference to the drawings. Note that the present invention is not limited by the embodiment. Components in the embodiment explained below include components that can be easily assumed by those skilled in the art or components substantially the same as the components.

Embodiment

Figure 1:
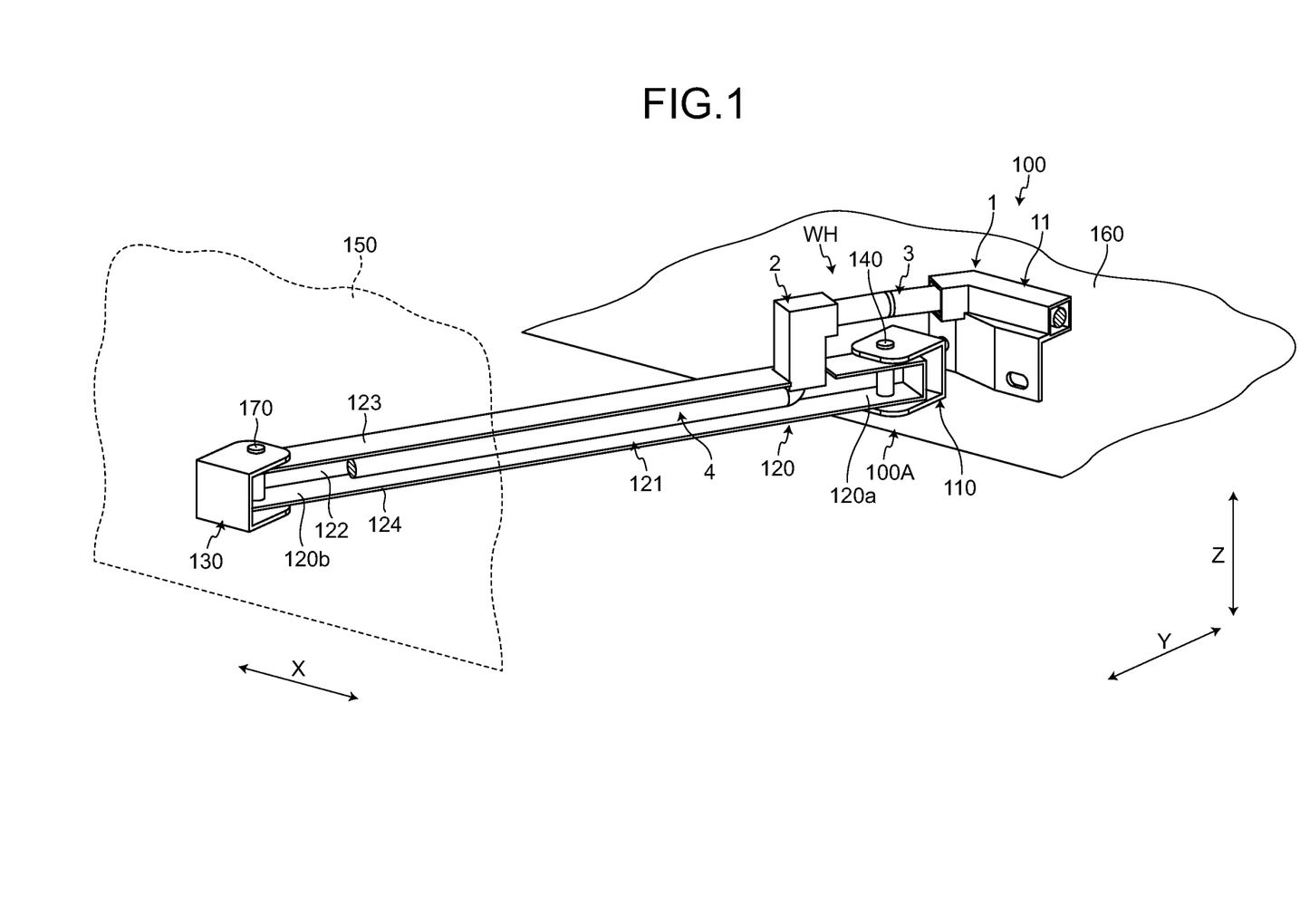
FIG. 1 is a perspective view illustrating a wire harness according to an embodiment.
Figure 3:
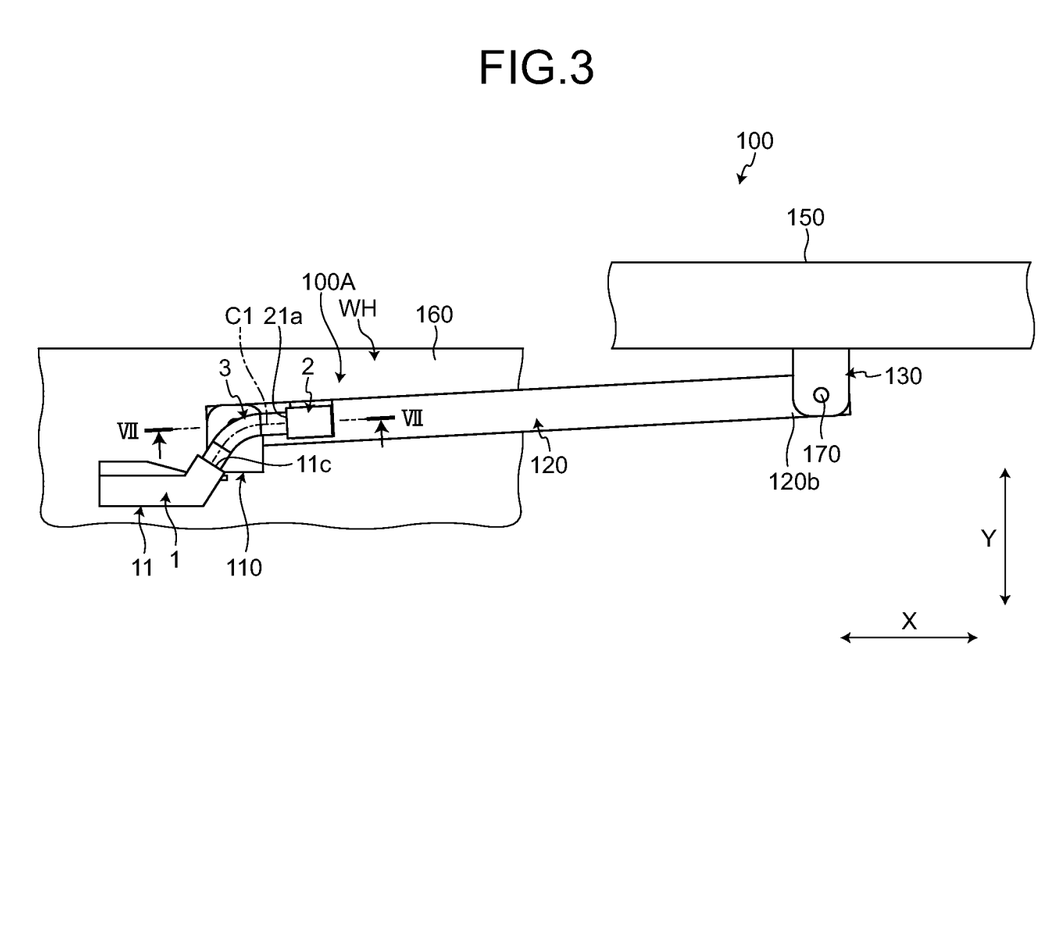
FIG. 3 is a plan view illustrating the wire harness in a fully closed position.
Figure 4:
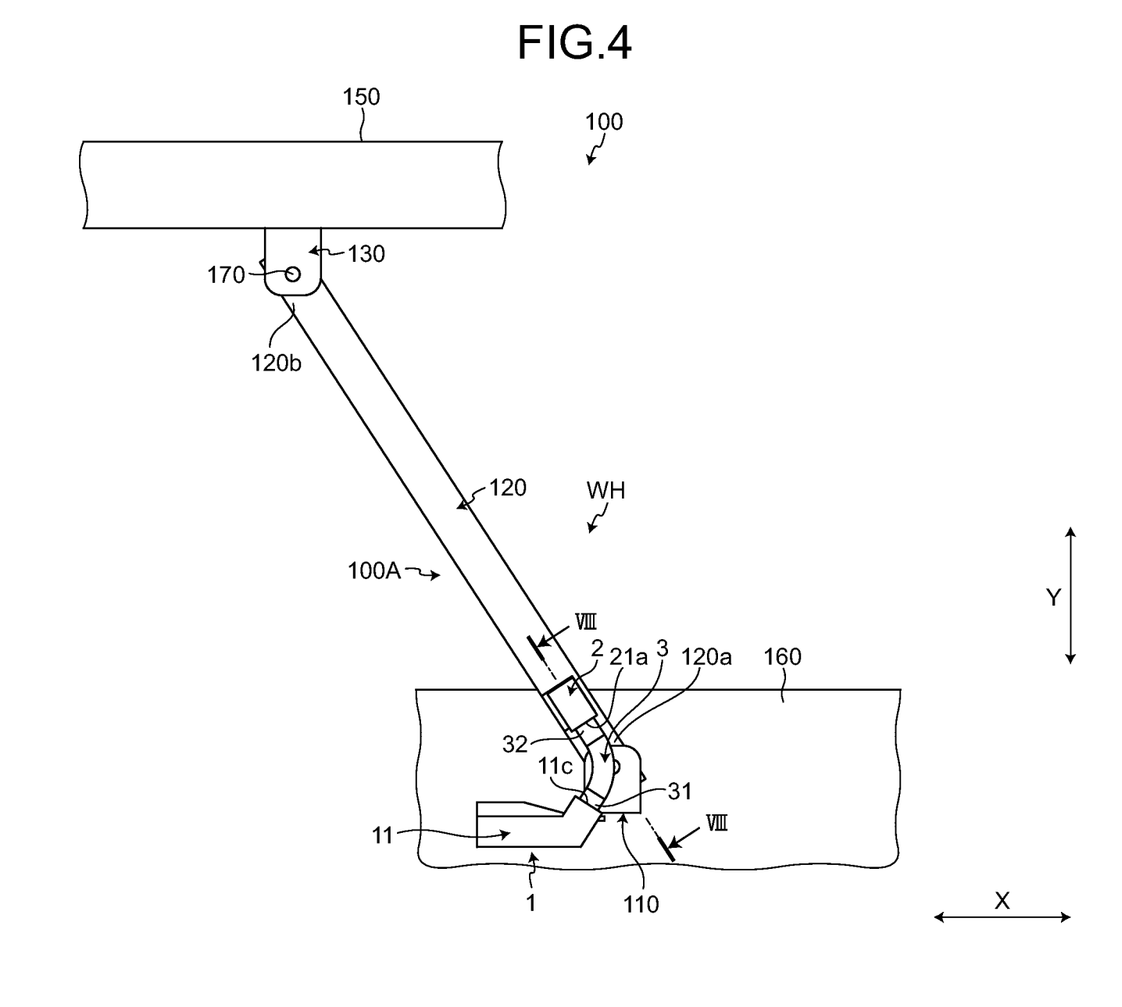
FIG. 4 is a plan view illustrating the wire harness in a fully open position.
Figure 5:
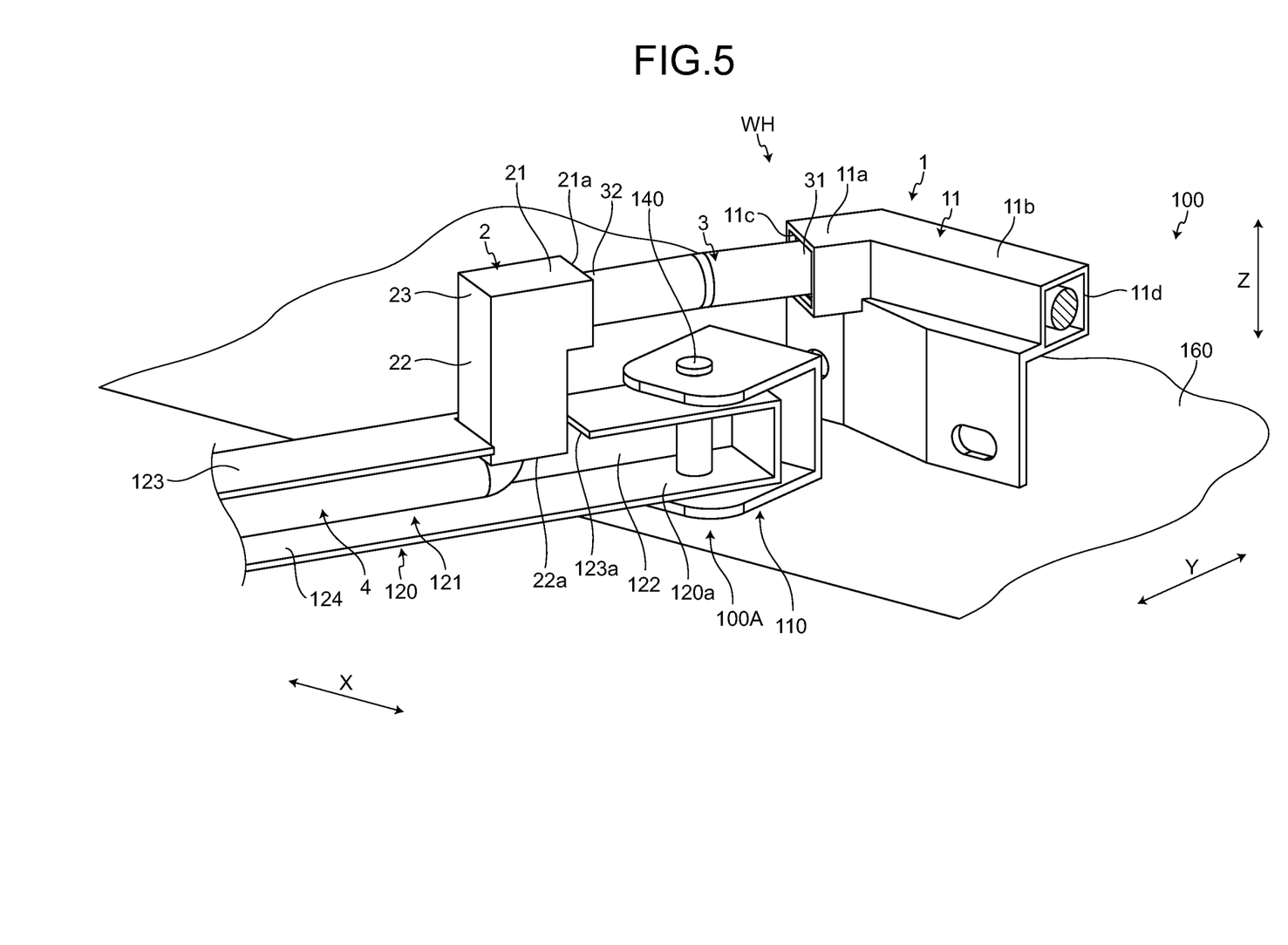
FIG. 5 is an enlarged perspective view of the wire harness according to the embodiment.
Figure 7:
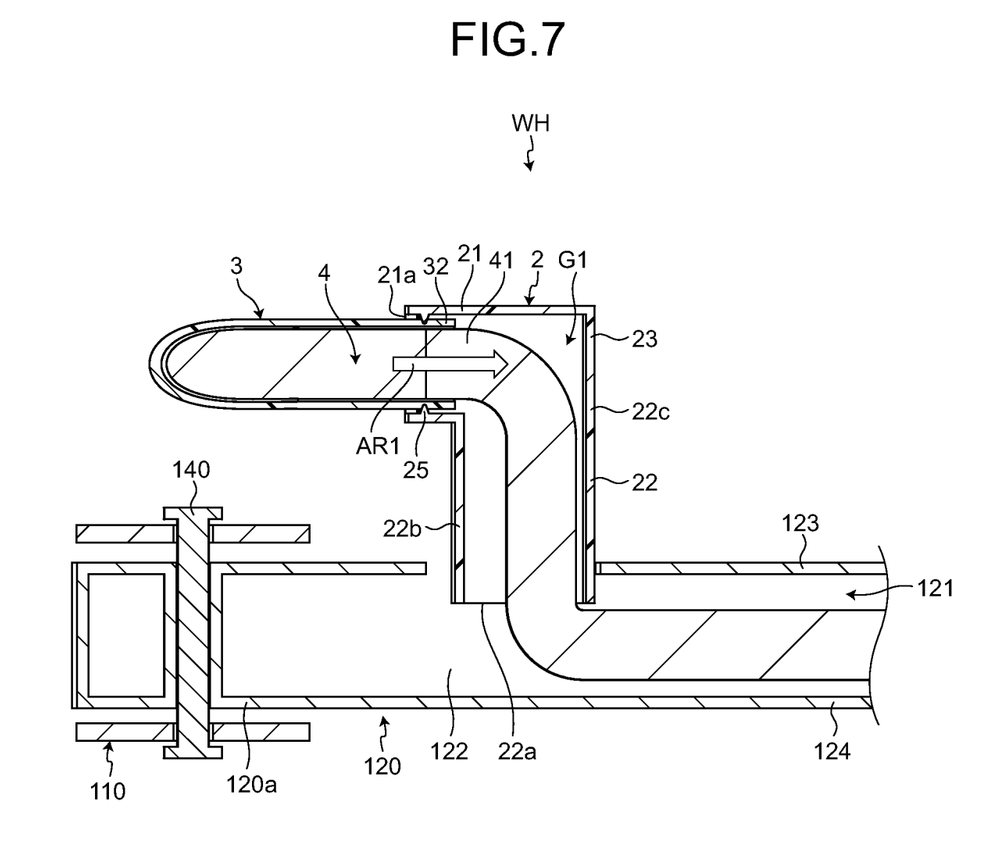
FIG. 7 is a sectional view of the wire harness according to the embodiment.
Figure 8:
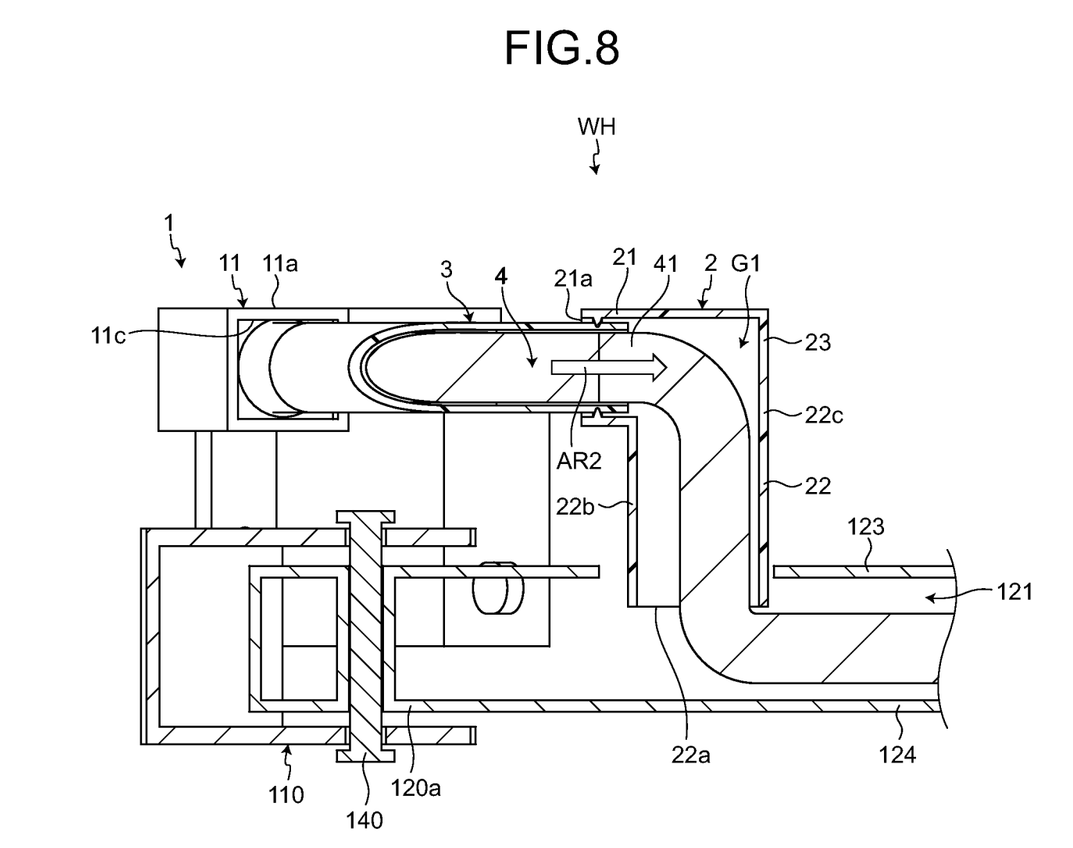
FIG. 8 is a sectional view of the wire harness according to the embodiment.

An embodiment is explained with reference to FIG. 1 to FIG. 8. The present embodiment relates to a wire harness. FIG. 1 is a perspective view illustrating a wire harness according to the embodiment, FIG. 2 is a plan view illustrating the wire harness in a half open position, FIG. 3 is a plan view illustrating the wire harness in a fully closed position, FIG. 4 is a plan view illustrating the wire harness in a fully open position, FIG. 5 is an enlarged perspective view of the wire harness according to the embodiment, and FIG. 6 to FIG. 8 are sectional views of the wire harness according to the embodiment.

Figure 2:
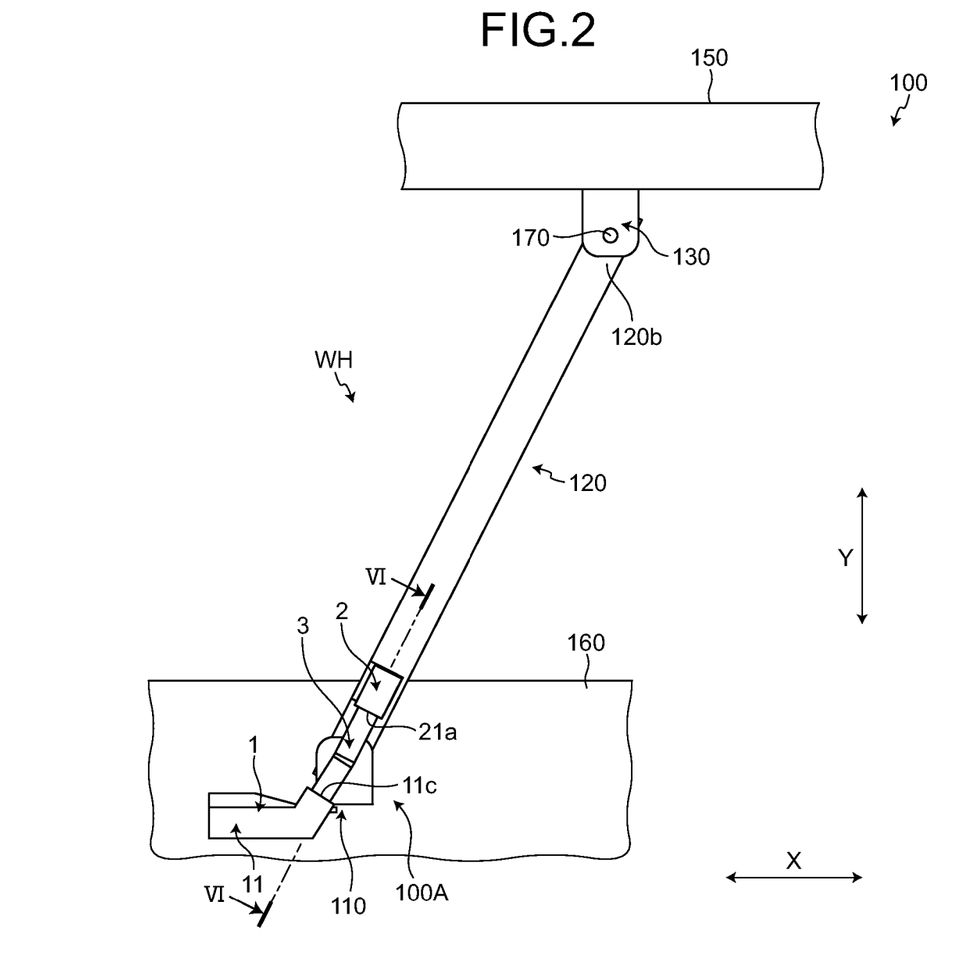
FIG. 2 is a plan view illustrating the wire harness in a half open position.
Figure 6:
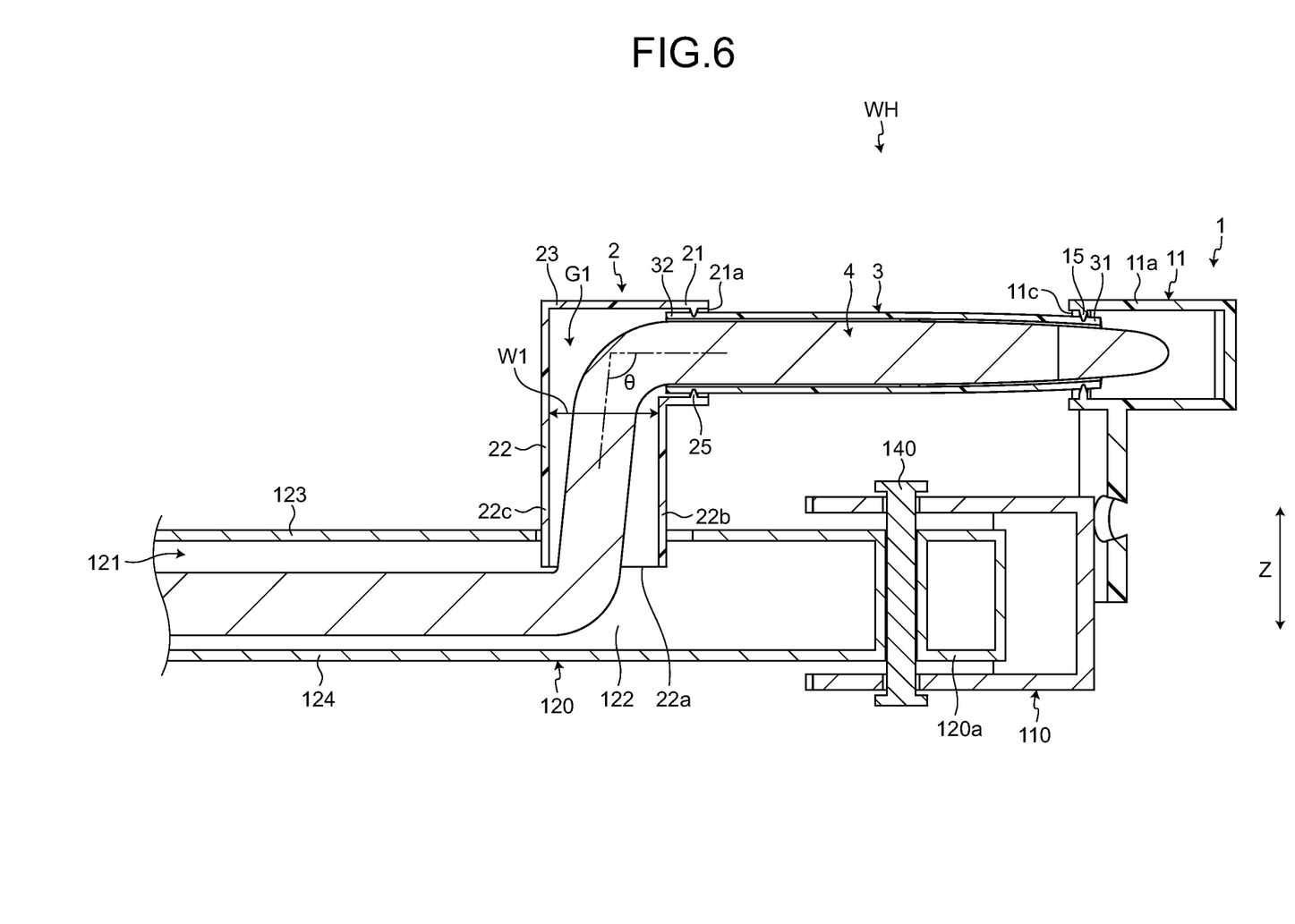
FIG. 6 is a sectional view of the wire harness according to the embodiment.

FIG. 6 illustrates a VI-VI cross section of FIG. 2. FIG. 7 illustrates a VII-VII cross section of FIG. 3. FIG. 8 illustrates a VIII-VIII cross section of FIG. 4.

As illustrated in FIG. 1, a wire harness WH in the present embodiment includes a first protector 1, a second protector 2, an exterior member 3, and an electric wire 4. The wire harness WH in the present embodiment is applied to, for example, a link mechanism 100A of a vehicle 100. The illustrated link mechanism 100A configures an opening and closing device that opens and closes a door 150 of the vehicle 100.

The link mechanism 100A includes a first link 110, a second link 120, a third link 130, and rotating shafts 140 and 170. The first link 110, the second link 120, and the third link 130 are formed of, for example, a metal plate. The first link 110 is a member fixed to a vehicle body 160 of the vehicle 100. The first link 110 is bent in a substantially U shape and is opened in a vehicle width direction Y.

The second link 120 is a member that rotates relatively to the first link 110. The second link 120 is formed in a groove shape and includes an internal space 121 in which the electric wire 4 is routed. The second link 120 includes a bottom wall 122, a first sidewall 123, and a second sidewall 124. The first sidewall 123 and the second sidewall 124 are erected from edges of the bottom wall 122. The first sidewall 123 and the second sidewall 124 face each other in the width direction of the bottom wall 122. The bottom wall 122 and the two sidewalls 123 and 124 form the internal space 121. The illustrated second link 120 is disposed with the first sidewall 123 directed upward in a vehicle up-down direction Z and the second sidewall 124 directed downward.

The second link 120 includes a base 120*a* and a distal end portion 120*b*. The base 120*a* is located at a first end portion of the longitudinal direction in the second link 120. The distal end portion 120*b* is located at a second end portion of the longitudinal direction in the second link 120. The base 120*a* is rotatably supported by the first link 110 via the rotating shaft 140. More specifically, the base 120*a* is inserted into the inside of the first link 110. The rotating shaft 140 pierces through the first sidewall 123 and the second sidewall 124 of the second link 120 and rotatably supports the second link 120. Both ends of the rotating shaft 140 are supported by the first link 110. The axial direction of the illustrated rotating shaft 140 is the vehicle up-down direction Z.

The second link 120 can rotate relatively to the first link 110 with the rotating shaft 140 as a rotation center. As illustrated in FIG. 2 to FIG. 4, the second link 120 rotates to move the distal end portion 120*b* in a vehicle front-rear direction X. FIG. 1 and FIG. 2 illustrate the link mechanism 100A at the time when the door 150 is present in a half open position, FIG. 3 illustrates the link mechanism 100A at the time when the door 150 is present in a fully closed position, and FIG. 4 illustrates the link mechanism 100A at the time when the door 150 is present in a fully open position.

The third link 130 is coupled to the distal end portion 120*b* of the second link 120. The third link 130 is rotatably supported by the second link 120 via the rotating shaft 170. The third link 130 is connected to the door 150.

The first protector 1 and the second protector 2 are members that protect the electric wire 4 and restrict a route of the electric wire 4. The first protector 1 and the second protector 2 are molded by, for example, insulative synthetic resin. As illustrated in FIG. 5, the first protector 1 is disposed in the first link 110. The first protector 1 may be fixed to the first link 110 or may be fixed to the vehicle body 160. The illustrated first protector 1 is disposed in contact with the first link 110.

The first protector 1 has a first tubular section 11 formed in a tubular shape. The first tubular section 11 houses and protects the electric wire 4 and restricts a route of the electric wire 4. The shape of the first tubular section 11 in a plan view is a substantially V-shape or a substantially L-shape bent at an intermediate portion. The first tubular section 11 includes a first linear section 11*a* and a second linear section 11*b*. The first linear section 11*a* and the second linear section 11*b* respectively linearly extend. The first linear section 11*a* and the second linear section 11*b* are connected to cross each other in a plan view. The shapes of the illustrated first linear section 11*a* and the illustrated second linear section 11*b* are rectangular tube shapes.

The first linear section 11*a* includes a first opening 11*c* opened toward the rotating shaft 140 side. The first protector 1 in the present embodiment is disposed such that the rotating shaft 140 is located on an extension line of the first linear section 11*a* in a plan view. For example, the first protector 1 is disposed such that the center axis of the first linear section 11*a* crosses the center axis of the rotating shaft 140. The center axis of the first linear section 11*a* and the center axis of the rotating shaft 140 may be orthogonal to each other. The second linear section 11*b* includes a second opening 11*d*. The illustrated second opening 11*d* is opened in the vehicle front-rear direction X.

The second protector 2 is disposed in the second link 120. A cutout 123*a* is provided in the first sidewall 123 of the second link 120. The cutout 123*a* is disposed in the base 120*a* or disposed in the vicinity of the base 120*a*. The shape of the cutout 123*a* in a plan view is, for example, rectangular. The second protector 2 is disposed in the cutout 123*a* and is held by the cutout 123*a*.

The second protector 2 includes a second tubular section 21, a third tubular section 22, and a bent section 23. The second tubular section 21, the third tubular section 22, and the bent section 23 are respectively formed in rectangular tubular shapes. The second tubular section 21 extends in the longitudinal direction of the second link 120 and is opened toward the rotating shaft 140 side. That is, the second tubular section 21 includes an opening 21*a* facing the rotating shaft 140 side. The second protector 2 in the present embodiment is fixed to the second protector 2 such that the rotating shaft 140 is located on an extension line of the second tubular section 21 in a plan view. For example, the second protector 2 is disposed such that the center axis of the second tubular section 21 crosses the center axis of the rotating shaft 140. The center axis of the second tubular section 21 and the center axis of the rotating shaft 140 may be orthogonal to each other.

The third tubular section 22 extends in a direction orthogonal to the longitudinal direction of the second link 120 and is fit in the cutout 123*a*. The illustrated third tubular section 22 extends in the vehicle up-down direction Z. The third tubular section 22 includes an opening 22*a* facing the internal space 121 of the second link 120. The opening 22*a* faces the second sidewall 124.

The bent section 23 is located between the second tubular section 21 and the third tubular section 22 and connects the second tubular section 21 and the third tubular section 22. The illustrated bent section 23 is bent at a right angle. That is, in the second protector 2 in the present embodiment, the second tubular section 21 and the third tubular section 22 are orthogonal to each other.

The exterior member 3 is a flexible tubular member and is configured to be stretchable. The exterior member 3 is molded by, for example, insulative synthetic resin. The exterior member 3 is, for example, a corrugated tube. The illustrated exterior member 3 has a cylindrical shape. As illustrated in FIG. 6, the exterior member 3 includes a first end portion 31 and a second end portion 32. The first end portion 31 is fixed to the first tubular section 11 of the first protector 1. As illustrated in FIG. 6, the first tubular section 11 includes a protrusion 15 that holds the exterior member 3. The protrusion 15 projects from the inner wall surface of the first linear section 11*a*. The first end portion 31 of the exterior member 3 is inserted into the first linear section 11*a* and locked by the protrusion 15. When the exterior member 3 is the corrugated tube, the protrusion 15 engages in an annular recess included in the exterior member 3.

The second end portion 32 of the exterior member 3 is fixed to the second tubular section 21 of the second protector 2. As illustrated in FIG. 6, the second tubular section 21 includes a protrusion 25 that holds the exterior member 3. The protrusion 25 protrudes from the inner wall surface of the second tubular section 21. The second end portion 32 of the exterior member 3 is inserted into the second tubular section 21 and locked by the protrusion 25. When the exterior member 3 is the corrugated tube, the protrusion 25 engages in the annular recess included in the exterior member 3.

As illustrated in FIG. 1, FIG. 5, and FIG. 6, the electric wire 4 is inserted through each of the first protector 1, the second protector 2, and the exterior member 3. The illustrated electric wire 4 connects equipment on the vehicle body 160 side and equipment on the door 150 side. The electric wire 4 is configured by, for example, binding a power supply line and a signal line. One end of the electric wire 4 is pulled out from the second opening 11*d* of the first protector 1. The electric wire 4 pulled out from the second opening 11*d* is connected to a power supply and a control device of the vehicle 100. The other end of the electric wire 4 is routed to the internal space 121 of the second link 120 and connected to equipment disposed in the door 150.

As illustrated in FIG. 6, the electric wire 4 is routed on the inside of the first protector 1, the inside of the exterior member 3, the inside of the second protector 2, and the internal space 121 of the second link 120. The electric wire 4 is curved on the inside of the second protector 2. More specifically, the electric wire 4 is curved along the shape of the bent section 23 on the inside of the bent section 23. The electric wire 4 illustrated in FIG. 6 is bent in the bent section 23 such that an angle θ formed by the center axis of the electric wire 4 is an obtuse angle. The electric wire 4 is further curved in the opening 22*a* of the second protector 2. The electric wire 4 is pulled out from the internal space 121 at the distal end portion 120*b* of the second link 120 and connected to the equipment on the door 150 side.

The third tubular section 22 of the second protector 2 includes a wall 22*b* on the inner side and a wall 22*c* on the outer side. The wall 22*b* on the inner side and the wall 22*c* on the outer side face each other in the longitudinal direction of the second link 120. That is, the wall 22*b* on the inner side and the wall 22*c* on the outer side face each other in the radial direction at the time when the second link 120 performs a rotational motion. The wall 22*b* on the inner side is located closer to the rotating shaft 140 than the wall 22*c* on the outer side. That is, the wall 22*b* on the inner side is located further on the center side in the radial direction compared with the wall 22*c* on the outer side.

A distance W1 between the wall 22*b* on the inner side and the wall 22*c* on the outer side is larger than the diameter of the electric wire 4. Therefore, the electric wire 4 can extend in a direction inclined with respect to the vehicle up-down direction Z on the inside of the third tubular section 22.

The second protector 2 is configured to be able to house an extra length of the electric wire 4 caused when the second link 120 turns. As illustrated in FIG. 6, a gap G1 is provided between the outer circumferential surface of the electric wire 4 and the inner wall surface of the second protector 2. The gap G1 is formed at least between the inner wall surface of the third tubular section 22 and the electric wire 4.

The electric wire 4 is fixed on each of the vehicle body 160 side and the second link 120 side. A target to which the electric wire 4 is fixed on the vehicle body 160 side is, for example, the first protector 1. The electric wire 4 is fixed to the first protector 1 by, for example, a binding member such as a band or a tape. A target to which the electric wire 4 is fixed on the second link 120 side is, for example, the second protector 2. The electric wire 4 is fixed to the second protector 2 by, for example, a binding member such as a band or a tape. The electric wire 4 is fixed to the second protector 2, for example, in the portion of the opening 22*a*. The electric wire 4 may be fixed to the wall 22*c* on the outer side.

Here, in the link mechanism 100A in the present embodiment, the line length between the first protector 1 and the second protector 2 changes according to the relative rotation of the second link 120 with respect to the first link 110. In a rotational position illustrated in FIG. 2, the first opening 11*c* of the first protector 1 and the opening 21*a* of the second protector 2 face each other and the shape of the exterior member 3 has a linear shape. In this case, the line length between the first protector 1 and the second protector 2 is maximized.

In contrast, in the fully closed rotational position illustrated in FIG. 3 and the fully open rotational position illustrated in FIG. 4, the direction of the first opening 11*c* and the direction of the opening 21*a* cross. In this case, the linear distance between the first opening 11*c* and the opening 21*a* is shorter compared with the rotational position in FIG. 2. That is, the line length between the first opening 11*c* and the opening 21*a* in the fully closed position and the fully open position is shorter than the line length at the time of the rotational position in FIG. 2.

In the wire harness WH in the present embodiment, the exterior member 3 extends and contracts according to the change in the line length. The exterior member 3 is configured to be elastically deformed and is stretchable in the axial direction. The exterior member 3 can extend such that a length L of the exterior member 3 is larger than a free length L0. Further, the exterior member 3 can be contracted such that the length L of the exterior member 3 is smaller than the free length L0. The exterior member 3 is flexurally deformed while extending and contracting in the axial direction according to a position change of the second protector 2 due to the turning of the second link 120. Accordingly, the exterior member 3 can follow the turning of the second link 120 while absorbing the change in the line length.

The exterior member 3 in the present embodiment is fixed such that the length of the exterior member 3 is the free length L0 in the fully closed position illustrated in FIG. 3. Here, the length L of the exterior member 3 is typically the length of a center axis C1 of the exterior member 3. In this case, in the half open position illustrated in FIG. 2, the length L of the exterior member 3 is longer than the free length L0. That is, when the second link 120 turns toward the position illustrated in FIG. 2, the exterior member 3 follows the second protector 2 while making the length L larger than the free length L0. The length L of the exterior member 3 in the fully open position illustrated in FIG. 4 is, for example, length equivalent to the free length L0.

The wire harness WH in the present embodiment includes a housing space for housing an extra length of the electric wire 4 caused according to the turning of the second link 120. The housing space in the illustrated wire harness WH is an internal space of the second protector 2.

FIG. 6 illustrates the second protector 2 and the electric wire 4 in the case in which the second link 120 is present in the half open position illustrated in FIG. 2. The electric wire 4 extends obliquely on the inside of the third tubular section 22. More specifically, the electric wire 4 is inclined with respect to the vehicle up-down direction Z to move toward the wall 22*c* on the outer side as the electric wire 4 approaches the opening 22*a* from the second tubular section 21. At this time, the electric wire 4 is inclined with respect to the wall 22*c* on the outer side. The gap between the electric wire 4 and the wall 22*c* on the outer side increases as the electric wire 4 approaches the second tubular section 21 in the vehicle up-down direction Z. The gap G1 at this time is located between the wall 22c on the outer side and the electric wire 4.

The second protector 2 and the electric wire 4 in the case in which the second link 120 is present in the fully closed position are illustrated in FIG. 7. As explained above, in the fully closed position, the line length between the first protector 1 and the second protector 2 decreases. Accordingly, when the second link 120 rotates from the half open position toward the fully closed position, the electric wire 4 is pushed into the inside of the second protector 2 as indicated by an arrow AR1 in FIG. 7. As a result, an extra length is caused in the electric wire 4. In the following explanation, a portion of the electric wire 4 pushed into the inside of the second protector 2 by the movement of the second link 120 is referred to as an extra length portion 41. The extra length caused by the rotation of the second link 120 corresponds to the length of the extra length portion 41.

The second protector 2 houses the extra length portion 41 of the electric wire 4. As illustrated in FIG. 7, the electric wire 4 is housed in the third tubular section 22 to extend along the wall 22c on the outer side. At this time, the electric wire 4 can extend in parallel to the wall 22c on the outer side in the third tubular section 22. That is, when the second link 120 rotates toward the fully closed position, the electric wire 4 moves on the inside of the second protector 2 and changes an angle of a curved portion. The second protector 2 includes a housing space that can allow such a movement of the electric wire 4 and a change in a bending angle of the electric wire 4. Accordingly, the second protector 2 can house the extra length portion 41 of the electric wire 4 and cause the electric wire 4 to follow the rotation of the second link 120.

The second protector 2 and the electric wire 4 in the case in which the second link 120 is present in the fully open position are illustrated in FIG. 8. When the second link 120 rotates from the half open position toward the fully open position, the electric wire 4 is pushed into the inside of the second protector 2 as indicated by an arrow AR2 in FIG. 8. The extra length portion 41 generated at this time is housed by the second protector 2.

As illustrated in FIG. 7 and FIG. 8, when the second link 120 is present in the fully closed position and the fully open position, the electric wire 4 is separated from the wall 22b on the inner side. Therefore, when the second link 120 rotates toward the half open position, the electric wire 4 can follow the rotation of the second link 120 while letting out the extra length portion 41 from the second tubular section 21.

As explained above, in the wire harness WH in the present embodiment, the extra length portion 41 of the electric wire 4 caused by the rotation of the second link 120 is housed in the second protector 2. Accordingly, the wire harness WH in the present embodiment has appropriate followability to the rotational motion of the link mechanism 100A. The wire harness WH in the present embodiment causes the exterior member 3 and the electric wire 4 to independently follow the rotation of the second link 120. The exterior member 3 follows the rotation of the second link 120 with the elasticity of the exterior member 3. The electric wire 4 follows the rotation of the second link 120 while changing the shape in the housing space.

In the wire harness WH in the present embodiment, the electric wire 4 is not fixed to the exterior member 3 and the electric wire 4 is slidable with respect to the exterior member 3. Accordingly, the electric wire 4 does not hinder the extension and contraction of the exterior member 3 and the exterior member 3 does not hinder the relative movement of the electric wire 4 with respect to the exterior member 3. That is, the exterior member 3 and the electric wire 4 can follow the rotational motion of the second link 120 while respectively having high independencies.

The housing space for housing the extra length of the electric wire 4 may be provided in a routing path on the first link 110 side. For example, the internal space of the first protector 1 may function as the housing space and house the extra length portion. The housing space may be provided in any one of the routing path on the first link 110 side and the routing path on the second link 120 side or may be provided in both of the routing paths.

As explained above, the wire harness WH in the present embodiment includes the first protector 1, the second protector 2, and the electric wire 4. The first protector 1 is disposed in the fixed first link 110. The second protector 2 is disposed in the second link 120 that is relatively rotatable with respect to the first link 110. The exterior member 3 is a flexible tubular member. The exterior member 3 includes the first end portion 31 fixed to the first protector 1 and the second end portion 32 fixed to the second protector 2. The electric wire 4 is inserted through each of the first protector 1, the second protector 2, and the exterior member 3 and is routed to the second link 120.

The second link 120 includes the base 120a located at one end in the longitudinal direction. The base 120a is supported by the first link 110 via the rotating shaft 140 such that the second link 120 is relatively rotatable with respect to the first link 110 centering on the base 120a. The first protector 1 includes the first tubular section 11 opened toward the rotating shaft 140 side. The first end portion 31 of the exterior member 3 is fixed to the first tubular section 11. The exterior member 3 extends and contracts according to a change in the line length between the first protector 1 and the second protector 2 caused by the relative rotation of the second link 120 with respect to the first link 110. The wire harness WH in the present embodiment can follow the rotating second link 120 according to the extension and contraction of the exterior member 3. Accordingly, the wire harness WH in the present embodiment can improve the followability to the rotational motion of the link mechanism 100A.

It is desirable that the exterior member 3 extends and contracts while sliding with respect to the electric wire 4 inserted through the inside of the exterior member 3. According to such a configuration, the following operation of the exterior member 3 can be made independent of the following operation of the electric wire 4.

The second protector 2 in the present embodiment includes the second tubular section 21 opened toward the rotating shaft 140. The second end portion 32 of the exterior member 3 is fixed to the second tubular section 21. Since the first tubular section 11 of the first protector 1 and the second tubular section 21 of the second protector 2 are respectively opened toward the rotating shaft 140 side, an extension and contraction operation of the exterior member 3 is smoothly performed.

The wire harness WH in the present embodiment includes the housing space for housing the extra length of the electric wire 4. The extra length of the electric wire 4 is an extra length caused by the relative rotation of the second link 120 with respect to the first link 110. The housing space is provided in at least one of the routing path on the first link 110 side and the routing path on the second link 120 side. Since the housing space for housing the extra length of the electric wire 4 is provided, the followability of the electric wire 4 to the rotation of the second link 120 is improved.

The second protector 2 in the present embodiment includes the second tubular section 21 opened toward the rotating shaft 140 side, the third tubular section 22, and the bent section 23. The third tubular section 22 is opened toward the internal space 121 of the second link 120. The bent section 23 has the tubular shape and connects the second tubular section 21 and the third tubular section 22. The electric wire 4 is curved on the inside of the bent section 23. The internal space of the second protector 2 functions as the housing space and houses the extra length of the electric wire 4. With such a configuration, the extra length is easily absorbed using the curved portion of the electric wire 4.

The shape and the disposition of the first protector 1 and the second protector 2 are not limited to the shape and the disposition illustrated in the embodiment. For example, the extra length absorbing structure in the embodiment may be applied to the second link 120 and the third link 130. In this case, for example, the first protector 1 is disposed with respect to the third link 130 and the second protector 2 is disposed with respect to the distal end portion 120b of the second link 120.

The link mechanism 100A to which the wire harness WH in the embodiment is applied is not limited to a mechanism for opening and closing the door 150. The link mechanism 100A is not limited to a mechanism mounted on the vehicle 100.

First Modification of the Embodiment

Figure 9:
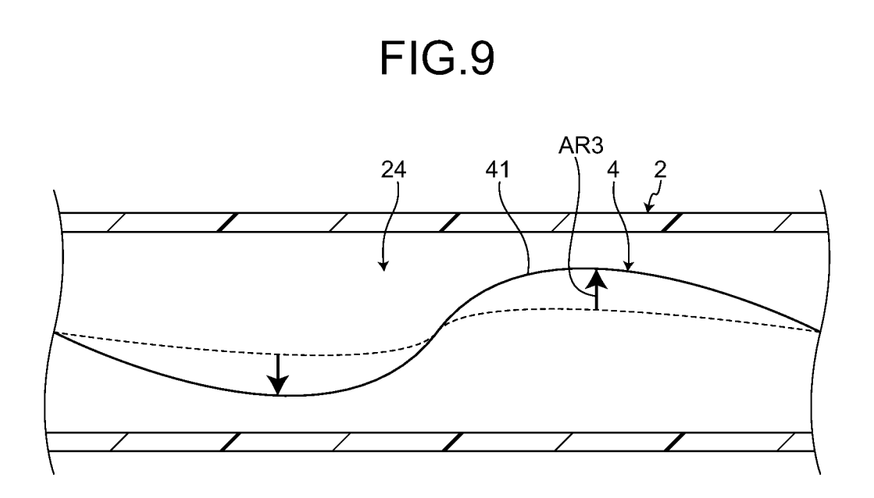
FIG. 9 is a diagram illustrating a housing space according to a first modification of the embodiment.

A first modification of the embodiment is explained. FIG. 9 is a diagram illustrating a housing space according to the first modification of the embodiment. A mode in which the extra length of the electric wire 4 is housed in the housing space is not limited to the mode illustrated in the embodiment explained above. The housing space 24 according to the first modification of the embodiment is a linear passage. The housing space 24 is provided, for example, in the second protector 2. For example, the electric wire 4 is routed to the housing space 24 in a meandering shape in advance as indicated by a broken line. When the extra length is caused in the electric wire 4, the electric wire 4 is deformed so that a degree of the meandering increases as indicated by an arrow AR3. Consequently, the extra length portion 41 of the electric wire 4 is housed in the housing space 24.

The contents disclosed in the embodiment and the modification explained above can be executed in combination as appropriate.

A wire harness according to the present embodiment includes: a first protector disposed in a fixed first link; a second protector disposed in a second link relatively rotatable with respect to the first link; and a flexible tubular exterior member including a first end portion fixed to the first protector and a second end portion fixed to the second protector. The exterior member extends and contracts according to a change in a line length between the first protector and the second protector caused by the relative rotation of the second link with respect to the first link. With the wire harness according to the present embodiment, there is an effect that it is possible to improve followability to a rotational motion of a link mechanism.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
a first protector disposed in a fixed first link;
a second protector disposed in a second link relatively rotatable with respect to the first link; and
a flexible tubular exterior member including a first end portion fixed to the first protector and a second end portion fixed to the second protector; and
an electric wire inserted through each of the first protector, the second protector, and the exterior member and routed to the second link; wherein
the second link includes a base located at one end in a longitudinal direction, and the base is supported by the first link via a rotating shaft such that the second link is relatively rotatable with respect to the first link centering on the base,
the first protector includes a first tubular section opened toward the rotating shaft,
the first end portion of the exterior member is fixed to the first tubular section, and
the exterior member extends and contracts according to a change in a line length between the first protector and the second protector caused by relative rotation of the second link with respect to the first link.

2. The wire harness according to claim 1, wherein
the second protector includes a second tubular section opened toward a side of the rotating shaft, and
the second end portion of the exterior member is fixed to the second tubular section.

3. The wire harness according to claim 1, further including a housing space that houses an extra length of the electric wire caused by the relative rotation of the second link with respect to the first link, wherein
the housing space is provided in at least one of a routing path on a side of the first link and a routing path on a side of the second link.

4. The wire harness according to claim 2, further including a housing space that houses an extra length of the electric wire caused by the relative rotation of the second link with respect to the first link, wherein
the housing space is provided in at least one of a routing path on a side of the first link and a routing path on a side of the second link.

5. The wire harness according to claim 3, wherein
the second protector includes the second tubular section opened toward a side of the rotating shaft, a third tubular section opened toward an internal space of the second link, and a tubular bent section that connects the second tubular section and the third tubular section,
the electric wire is curved on an inside of the bent section, and
an internal space of the second protector functions as the housing space and houses the extra length.

* * * * *